$Pb(Zr_{0.52}Ti_{0.48})O_3 + 0.2\ wt.\%\ NiO + (0.02\ to\ 1.0)\ wt.\%\ MnO$

United States Patent Office 3,481,874
Patented Dec. 2, 1969

3,481,874
PIEZOELECTRIC CERAMIC COMPOSITION
Tsuneo Akashi, Masao Takahashi, and Norio Tsubouchi, Tokyo, Japan, assignors to Nippon Electric Company, Limited, Tokyo, Japan, a corporation of Japan
Filed Oct. 17, 1966, Ser. No. 587,241
Claims priority, application Japan, Oct. 19, 1965, 40/64,094; Dec. 15, 1965, 40/76,660, 40/76,661
Int. Cl. C04b $35/28, 35/12$
U.S. Cl. 252—62.9      6 Claims

ABSTRACT OF THE DISCLOSURE

A piezoelectric ceramic composition of the formula $(Pb_uA_v)(Zr_xTi_ySn_z)O_3$, where A represents at least one member selected from a group consisting of calcium, strontium, and barium and $u$, $v$, $x$, $y$ and $z$ are given by: $u=0.75-1.00$, $v=0.00-0.25$, $u+v=1.00$, $x=0.00-0.90$, $y=0.10-0.60$, $z=0.00-0.65$, and $x+y+z=1.00$, contains a set of additional constituents consisting of a gallium compound equivalent in amount to gallium sesquioxide of from .01 to 1.5 weight percent and a chromium compound equivalent in amount to chromium sesquioxide of from .01 to .70 weight percent, each of the weight percentages being the percentage of the total weight of said ceramic composition.

---

Figure 1:
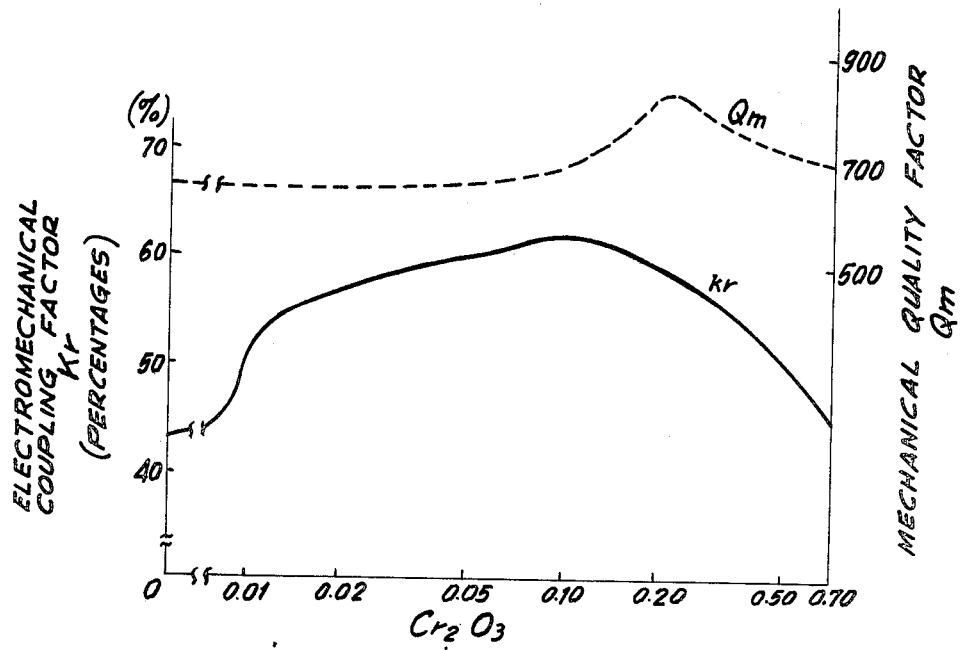

This invention relates generally to piezoelectric ceramic compositions. More particularly, this invention relates to ceramic compositions based on a formula of lead zirconate-lead titanate $PbZrO_3$-$PbTiO_3$ or on a related formula lead zirconate-lead titanate-lead stannate $PbZrO_3$-$PbTiO_3$-$PbSnO_3$.

The present invention relates more particularly to lead zirconate-lead titanate-lead stannate ($PbZrO_3$-$PbTiO_3$-$PbSnO_3$) ceramic compositions which contain, in addition to such compositions, chromium sesquioxide ($Cr_2O_3$) of from 0.01 weight percent to 0.7 weight percent of the total weight and also gallium sesquioxide ($Ga_2O_3$) of from 0.01 weight percent to 1.5 weight percent.

The present invention also relates to $PbZrO_3$-$PbTiO_3$-$PbSnO_3$ ceramic compositions which contain, in addition to such compositions, manganous oxide (MnO) of from 0.02 weight percent to 1.0 weight percent of the total weight and also nickel oxide (NiO) of from 0.02 weight percent to 2.0 weight percent.

The present invention further relates to $PbZrO_3$-$PbTiO_3$-$PbSnO_3$ ceramic compositions which contain, in addition to such compositions, nickel oxide (NiO) of from 0.02 to 2.0 weight percent and also chromium sesquioxide ($Cr_2O_3$) of from 0.01 to 0.5 weight percent.

A general object of this invention is to provide ceramic compositions having large electromechanical coupling factors and large mechanical quality factors.

A further object of this invention is to provide piezoelectric materials which have both large electromechanical coupling factors and large mechanical quality factors for use as elements of ceramic electric wave filters and as transducer elements of mechanical filters.

It can be established that a lead zirconate-lead titanate solid solution $Pb(ZrTi)O_3$, obtained by sintering a mixture of lead zirconate $PbZrO_3$ and lead titanate $PbTiO_3$, has piezoelectric properties which are stable against change of temperature and elapse of time and that strong piezoelectric activities are achieved in the neighborhood of $x=0.52-0.54$ in $Pb(Zr_x:Ti_{1-x})O_3$.

Fundamental measures for evaluating the piezoelectric properties of a piezoelectric material are its electromechanical coupling factor and its mechanical quality factor. The electromechanical coupling factor represents the efficiency of transforming electric oscillation into mechanical vibration and, conversely, of transforming mechanical vibration into electric oscillation. The mechanical quality factor represents the reciprocal proportion of the energy consumed by the material during the electrical and mechanical energy interconversion. A larger mechanical quality factor corresponds to a smaller energy consumption by the material, and vice versa.

Recently, attention and studies have been directed to ceramic electric wave filters wherein use is made of piezoelectric ceramics as the element or elements of the filters, and to mechanical filters wherein use is also made of piezoelectric ceramics as the transducer or transducers thereof. The qualities desired for the piezoelectric ceramics used in these fields of application are as follows: For the elements of ceramic electric wave filters, the electromechanical coupling factor must have a desired value selected from a range between an extremely large value and a very small value, and the mechanical quality factor should have as great a value as possible. For the transducer elements of mechanical filters, both the electromechanical coupling factor and the mechanical quality factor must be as large as possible. Thus, the properties required for the transducer elements of mechanical filters are consistent with that particular set of properties demanded for the elements of ceramic electric wave filters in which the electromechanical coupling factor is large.

The electromechanical coupling factor determines the frequency spacing between the attenuation poles of the filter in such a manner that a greater electromechanical coupling factor produces a filter of wider frequency spacing and a smaller electromechanical coupling factor results in a filter of narrower frequency spacing. In other words, the electromechanical coupling factor of the piezoelectric material for the elements of ceramic filter must be selected in compliance with the frequency spacing between the attenuation poles of the particular filter in which the material is to be used and that factor must therefore be available or adjustable between an extremely small value and a very large value according to the characteristics of the filter. The mechanical quality factor also determines the loss in the pass band and the loss at the attenuation poles of the filter. The values desired for a filter therefore determine the lowest allowable limit of the mechanical quality factor of the piezoelectric material to be used in the filter. In other words, a piezoelectric material having a smaller mechanical quality factor than required can not provide a satisfactory filter, while a piezoelectric material having a greater mechanical quality factor than required can easily provide a filter of excellent characteristics. A greater mechanical quality factor is generally necessary for piezoelectric materials to be used in a filter of narrower pass band or for a case where a smaller electromechanical coupling factor is required.

As has so far been described, piezoelectric material for use in filters must be furnished with the electromechanical coupling factor selected from a wide range according to the characteristics and the fields of application of the particular filter and with the largest possible mechanical quality factor.

According to this invention, the basic composition of lead zirconate-lead titanate may incorporate any one of the respective pairs of additives above noted, that is, $Ga_2O_3$ and $Cr_2O_3$, NiO and MnO, and NiO and $Cr_2O_3$, in the required amounts and, in such basic composition, at least one member of the group consisting of barium (Ba), strontium (Sr) and calcium (Ca) may replace up to 25 atom percent of the lead (Pb) contained in the basic composition.

It is especially noted, as will be explained by way of example, that improvements in the characteristics of the various compositions of this invention may be brought about by the addition of gallium oxide, chromium sesquioxide, nickel oxide, and manganous oxide, in the amounts and in the combinations specified herein, and such improvements clearly result from the presence of gallium ions, chromium ions, nickel ions and manganous or manganese ions, respectively, in the lead zirconate-lead titanate ceramics. Gallium compounds [for example, $GaCl_3$ or $Ga_2(SO_4)_3$], other than gallium sesquioxide ($Ga_2O_3$), may be used in the composition so as to provide an amount of gallium ions equivalent to that derived from gallium sesquioxide ($Ga_2O_3$). Similarly chromium compounds (for example $CrCl_3$), other than chromium sesquioxide ($Cr_2O_3$), may be used in the composition so as to provide an amount of chromium ions equal to the amount of chromium ions provided by chromium sesquioxide ($Cr_2O_3$) when it is used in the composition. Also, if nickel compounds, other than NiO, are employed, they should be supplied in amounts to yield nickel ions in an amount equivalent to that of NiO. Furthermore, if manganous or manganese compounds, other than MnO, are utilized, they should be used in amounts equivalent to the desired weight of MnO for yielding the appropriate amount of manganous or manganese ions.

This invention may also be expressed as residing in a piezoelectric ceramic composition whose basic composition may be represented by $Pb(Zr_xTi_ySn_z)O_3$, where $x$, $y$, and $z$ represent a set of mol ratios and such mol ratios are given by $x=0.00-0.90$, $y=0.10-0.60$, $z=0.00-0.65$, and $x+y+z=1.00$.

Compositions outside of the suggested ranges are not practically operable because of their seriously reduced electromechanical coupling factors. The largest electromechanical coupling factor is obtainable in cases in which $x$, $y$, and $z$ are in the vicinities of 0.52–0.53, 0.48–0.47, and 0.00, respectively. Also, excellent piezoelectric properties are obtained even if at least one member of the group of calcium, strontium and barium may be substituted for up to 25 atom percent of the lead contained in the basic composition.

Details of certain earlier types of replacements or substitutions in piezoelectric materials are generally described, for example, in "Journal of the National Bureau of Standards," 55 (1955), 239 by B. Jaffe, R. S. Roth, and S. Marzullo and in U.S. Patents No. 2,906,710 issued to F. Kulcsar et al. on Sept. 29, 1959, and No. 3,068,177 issued to J. A. Sugden on Dec. 11, 1962.

Said basic composition may contain, as additional constituents, both gallium sesquioxide ($Ga_2O_3$) of from 0.01 weight percent to 1.5 weight percent of the total weight and chromium sesquioxide ($Cr_2O_3$) of from 0.01 weight percent to 0.70 weight percent of the total weight.

The compositions of this invention may also consist of the above-noted basic composition of $Pb(Zr_xTi_ySn_z)O_3$ where $x$, $y$, and $z$ are given by the above equations and where at least one member of the group of calcium, strontium and barium may be replaced by up to 25 atom percent of lead (Pb) contained in the basic composition, and such basic composition may include additional constituents of nickel oxide (NiO) of from 0.02 weight percent to 2.0 weight percent and also manganese oxide (MnO) of from 0.02 weight percent to 1.0 weight percent.

The compositions of this invention may also consist of the above-noted basic composition of $Pb(Zr_xTi_ySn_z)O_3$, where $x$, $y$, and $z$ are given by the above equations and where at least one member of the group of calcium, strontium and barium may be replaced by up to 25 atom percent of the lead (Pb) contained in said basic composition, and to said basic composition there may be added constituents of nickel oxide (NiO) of from 0.02 weight percent to 2.0 weight percent and also chromium sesquioxide ($Cr_2O_3$) of from 0.01 weight percent to 0.5 weight percent.

The resulting basic compositions above-noted are especially suitable as piezoelectric materials for the elements of electric wave filters and for the transducer elements of mechanical filters.

As for the piezoelectric materials to be used in the elements of ceramic electric wave filters, it is necessary that such materials provide an electromechanical coupling factor with an optimum value selected from a wide range extending from an extremely large value to a very small value, and it is also desirable for the mechanical quality factor to have as great a value as possible. This criterion is described, for example, in "Electronic Engineering," vol. 33 (1961), No. 3, pp. 171–177, by R. C. V. Macario, entitled "Design Data for Band-Pass Ladder Filters Employing Ceramic Resonators."

This invention will be better understood from the more detailed description hereinafter following when read in connection with the accompanying drawing in which:

FIG. 1 shows curves representing the electromechanical coupling factor $Kr$ for the radial mode vibration and the mechanical quality factor $Qm$, both plotted as ordinates, against abscissae representing the content of chromium sesquioxide ($Cr_2O_3$) in ceramics obtained by adding, to the composition $Pb(Zr_{0.52}Ti_{0.48})O_3$, the compound gallium sesquioxide ($Ga_2O_3$) of 0.50 weight percent and the compound chromium sesquioxide ($Cr_2O_3$) of up to 0.70 weight percent. These curves are based upon compositions given, for example, in Table 1 listed hereinafter.

Figure 2:
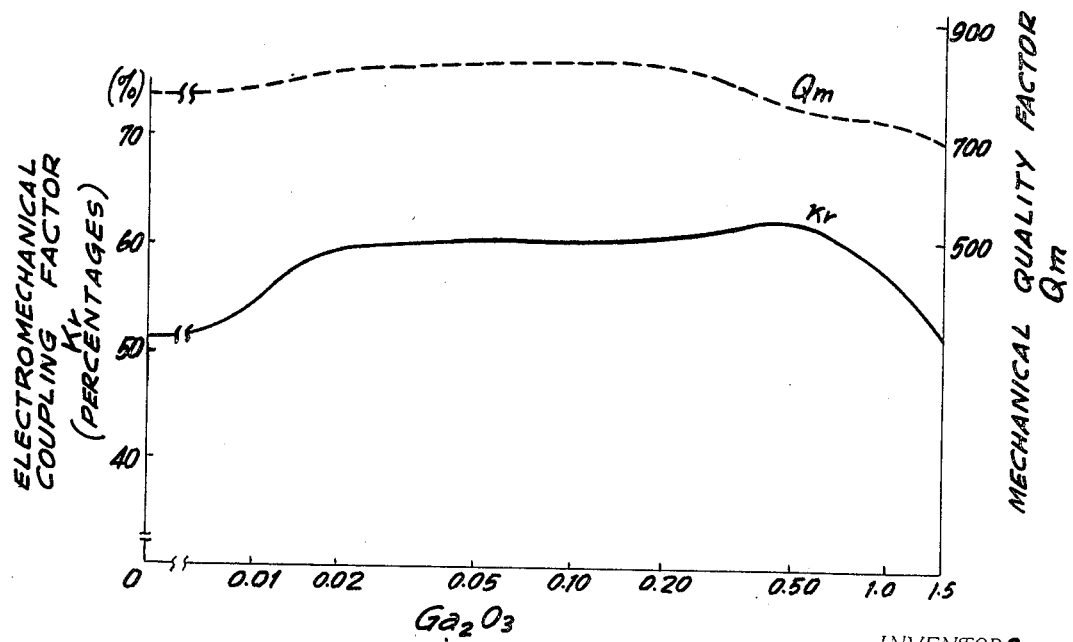

FIG. 2 shows curves representing the factors $Kr$ and $Qm$, both plotted as ordinates, against abscissae representing the content of gallium sesquioxide ($Ga_2O_3$) in ceramics obtained by adding, to the composition $Pb(Zr_{0.52}Ti_{0.48})O_3$, the compound chromium sesquioxide ($Cr_2O_3$) of 0.10 weight percent and the compound gallium sesquioxide ($Ga_2O_3$) of up to 1.5 weight percent. The curves of FIG. 2 are based on compositions given, for example, in Table 2 listed hereinafter.

Figure 3:
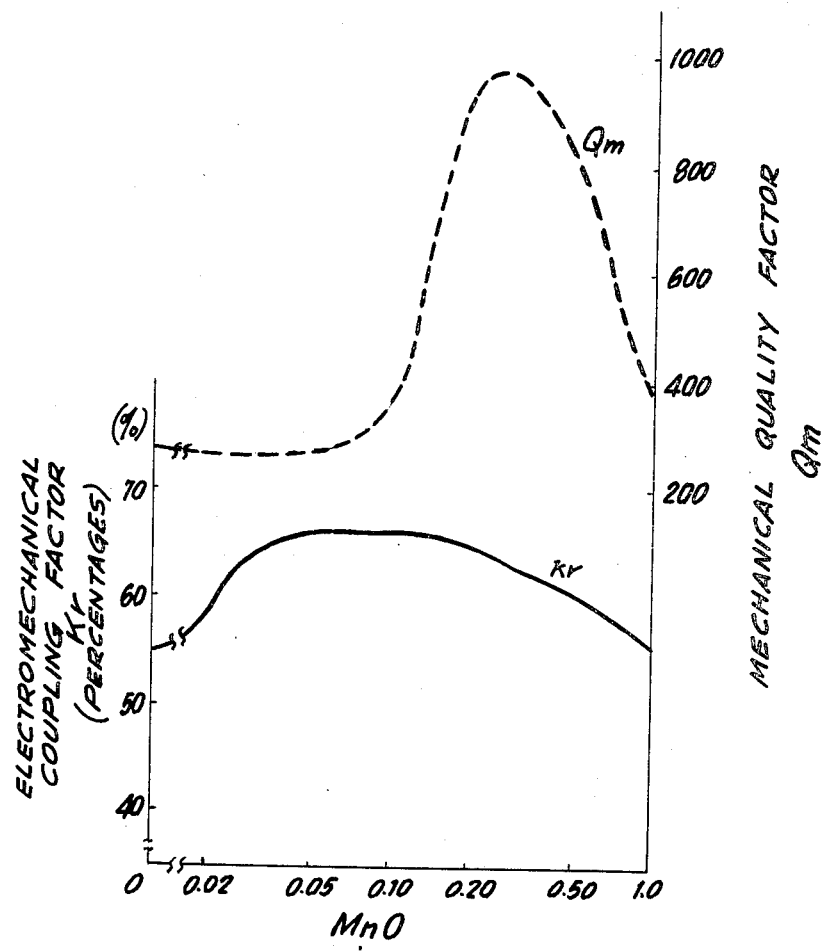
Figure 4:
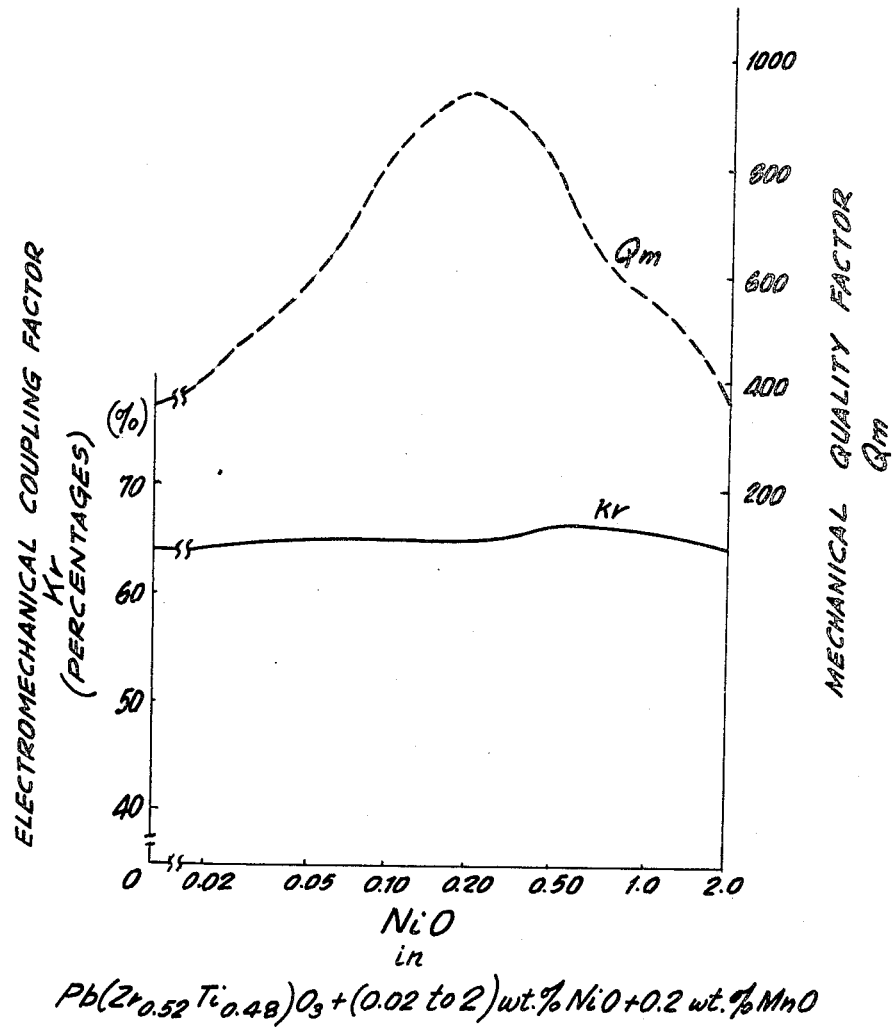

FIGS. 3 and 4 show similar curves representing the electromechanical coupling factor $Kr$ for the radial mode vibration and the mechanical quality factor $Qm$, both plotted as ordinates, for the composition $Pb(Zr_{0.52}Ti_{0.48})O_3$ to which NiO and MnO compounds have been added. In FIG. 3, the abscissae are MnO and in FIG. 4 they are NiO. The curves of FIG. 3 are based on compositions given in Table 5; the curves of FIG. 4 are based on Table 6.

Figure 5:
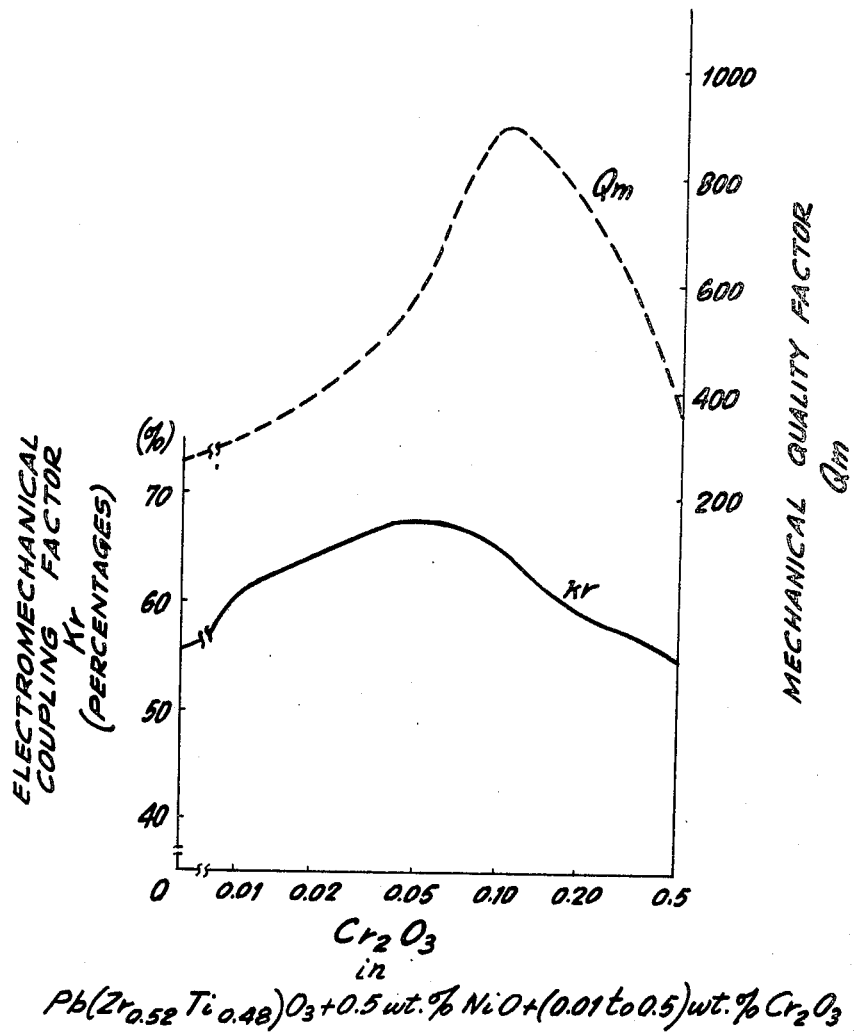
Figure 6:
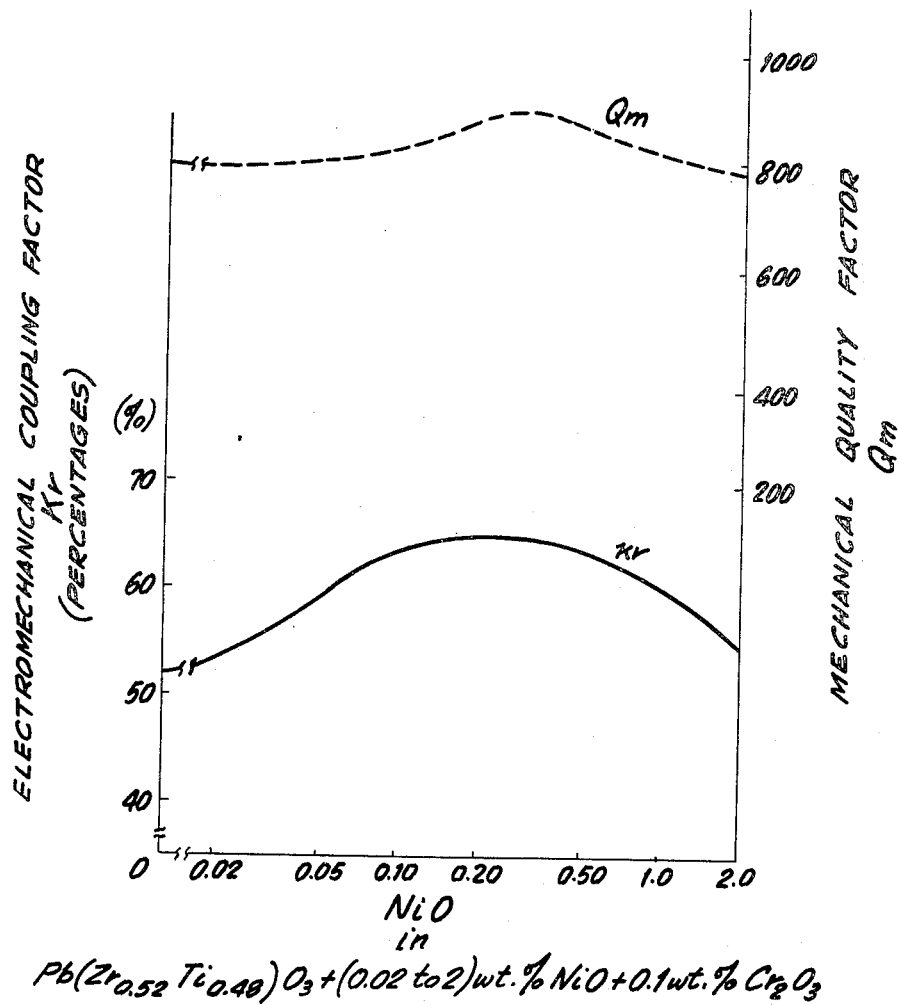

FIGS. 5 and 6 show similar curves for the same $Kr$ and $Qm$ factors. The abscissae of FIG. 5 are related to the addition of the compound chromium sesquioxide ($Cr_2O_3$), while the abscissae of FIG. 6 are related to the addition of the compound nickel oxide (NiO). The curves of FIG. 5 are based on the compositions given in Table 10; the curves of FIG. 6 are based on the compositions of Table 11.

Reference is now made to FIG. 1 showing curves representing, as already noted, the electromechanical coupling factor $Kr$ for the radial mode vibration and the mechanical quality factor $Qm$, both plotted as ordinates as shown, against abscissae representing the content of chromium sesquioxide ($Cr_2O_3$) in ceramics whose basic composition is given by the term $Pb(Zr_{0.52}Ti_{0.48})O_3$ and whose additional constituents are gallium sesquinoxide ($Ga_2O_3$) of 0.50 weight percent of the total weight and chromium sesquioxide ($Cr_2O_3$) of up to 0.70 weight percent of the total weight. This composition and the additives which are considered in Table 1, provide the basis for the curves of FIG. 1.

The lead zirconate-lead titanate composition given by the term $Pb(Zr_{0.52}Ti_{0.48})O_3$, if piezoelectrically activated through polarization treatment effected at 100° C. has a set of values of about 42 percent for the factor $Kr$ and about 250 for the factor $Qm$. FIG. 1 and Table 1 show that the addition of 0.50 weight percent of gallium sesquioxide ($Ga_2O_3$) alone to the composition $Pb(Zr_{0.52}Ti_{0.48})O_3$ augments the factor $Qm$ to a remarkable extent. The curves and Table 1 furthermore show that the addition of both gallium sesquioxide ($Ga_2O_3$) of 0.50 weight percent and chromium sesquioxide ($Cr_2O_3$) of from 0.01 weight percent to 0.70 weight percent remarkably augments the value of the factor $Kr$ while not deteriorating or even further augmenting the value of the factor $Qm$ resulting from the addition of gallium sesquioxide ($Ga_2O_3$) alone. This combination provides excellent piezoelectric materials for use in ceramic electric filters where a large $Kr$ factor is required and for use in transducers of mechanical filters. The curves still further show that the piezoelectric activities are little improved by coexistence of chromium sesquioxide ($Cr_2O_3$) and gallium sesquioxide ($Ga_2O_3$) in case the content of chromium sesquioxide ($Cr_2O_3$) is less than 0.01 weight percent. Although not shown by the curves, the results of experiments also show that chromium sesquioxide ($Cr_2O_3$), if contained in excess of 0.70 weight percent, reduces the electric resistivity of the composition so as to disable thorough polarization treatment and this results in a decrease in both of the $Kr$ and $Qm$ factors and a consequent marked deterioration of the piezoelectric properties.

In view of the above results, the effective range for the content of chromium sesquioxide ($Cr_2O_3$) in the case in which both gallium sesquioxide ($Ga_2O_3$) and chromium sesquioxide ($Cr_2O_3$) are added to the composition, is set at between 0.01 weight percent and 0.70 weight percent.

Reference is now made to FIG. 2 which shows curves which represent, as already noted, the relations between factors $Kr$ and $Qm$, on the one hand, and the content of gallium sesquioxide ($Ga_2O_3$), on the other hand, in the ceramics whose basic composition is lead ziconate-lead titanate given by the formula $Pb(Zr_{0.52}Ti_{0.48})O_3$ as was the case with FIG. 1 and whose additional constituents are gallium sesquioxide ($Ga_2O_3$) of up to 1.5 weight percent and chromium sesquioxide ($Cr_2O_3$) of 0.10 weight percent. The combination of such constituents are included in Table 2.

FIG. 2 and Table 2 show that the addition of 0.10 weight percent of chromium sesquioxide ($Cr_2O_3$) alone raises the value of the $Kr$ and $Qm$ factors as compared with the $Kr$ and $Qm$ factors of lead zirconate-lead titanate represented by the composition $$Pb(Zr_{0.52}Ti_{0.48})O_3$$

The curves of FIG. 2 when considered with Table 2 further show that the addition of chromium sesquioxide ($Cr_2O_3$) of 0.10 weight percent and gallium sesquioxide ($Ga_2O_3$) of from 0.01 weight percent to 1.5 weight percent not only further augments, or, at the worst, only slightly deteriorates, the value of the factor $Qm$ resulting from the addition of chromium sesquioxide ($Cr_2O_3$) but also remarkably raises the value of the factor $Kr$ to provide materials being excellent piezoelectric properties. The curves still further show that the piezoelectric properties are little improved even by coexistence of the compounds gallium sesquioxide ($Ga_2O_3$) and chromium sesquioxide ($Cr_2O_3$) in case the content of gallium sesquioxide ($Ga_2O_3$) is less than 0.01 weight percent. Although not shown by the curves, the results of experiments show that improvements in the properties are scarcely expected from the addition of both gallium sesquioxide ($Ga_2O_3$) and chromium sesquioxide ($Cr_2O_3$) if the content of gallium sesquioxide ($Ga_2O_3$) exceeds 1.5 weight percent. In other words, in case the content of gallium sesquioxide ($Ga_2O_3$) is more than 1.5 weight percent, both $Kr$ and $Qm$ factors decrease with any increase in the content of gallium sesquioxide ($Ga_2O_3$) and the piezoelectric properties achieved are poorer than those attained by the addition of chromium sesquioxide ($Cr_2O_3$) alone.

From the foregoing, a range between 0.01 weight percent and 1.5 weight percent is selected for the content of gallium sesquioxide ($Ga_2O_3$) in the case of coexistence of gallium sesquioxide ($Ga_2O_3$) and chromium sesquioxide ($Cr_2O_3$).

Some examples of this invention will be given hereunder.

Example 1.—Results shown in Table 1

So that the resulting basic composition may be given by $Pb(Zr_{0.52}Ti_{0.48})O_3$, 50 mol percent of lead monoxide (PbO), 26 mol percent of zirconium dioxide ($ZrO_2$), and 24 mol percent of titanium dioxide ($TiO_2$) were arranged for various mixtures, such constituents were supplied with an additive of 0.50 weight percent of gallium sesquioxide ($Ga_2O_3$), and these constituents were supplied with further additives of from 0.01 weight percent up to 0.70 weight percent of chromium sesquioxide ($Cr_2O_3$). As shown in Table 1, these compounds were then mixed, respectively, in a ball mill, pre-sintered at 900° C. for an hour, crushed, press-moulded into discs, sintered at 1300° C. for an hour, provided with silver electrodes, respectively, subjected to a polarization treatment at 100° C. for an hour under an electric field of 50 k.v./cm., allowed to stand for 24 hours, and then the factors of $Kr$ and $Qm$ were measured. The results obtained for the various combinations are shown in Table 1. The results were obtained for the basic composition alone (No. 1) and for the basic composition with an addition of 0.50 weight percent of gallium sesquioxide ($Ga_2O_3$) alone (No. 2).

TABLE 1

| No. | Composition | Kr (percent) | Qm |
|---|---|---|---|
| 1 | $Pb(Zr_{0.52}Ti_{0.48})O_3$ | 42 | 250 |
| 2 | $Pb(Zr_{0.52}Ti_{0.48})O_3$ plus 0.50 wt. percent $Ga_2O_3$ | 43 | 630 |
| 3 | $Pb(Zr_{0.52}Ti_{0.48})O_3$ plus 0.50 wt. percent $Ga_2O_3$ plus 0.01 wt. percent $Cr_2O_3$ | 50 | 620 |
| 4 | $Pb(Zr_{0.52}Ti_{0.48})O_3$ plus 0.50 wt. percent $Ga_2O_3$ plus 0.02 wt. percent $Cr_2O_3$ | 57 | 630 |
| 5 | $Pb(Zr_{0.52}Ti_{0.48})O_3$ plus 0.50 wt. percent $Ga_2O_3$ plus 0.05 wt. percent $Cr_2O_3$ | 60 | 640 |
| 6 | $Pb(Zr_{0.52}Ti_{0.48})O_3$ plus 0.50 wt. percent $Ga_2O_3$ plus 0.10 wt. percent $Cr_2O_3$ | 62 | 670 |
| 7 | $Pb(Zr_{0.52}Ti_{0.48})O_3$ plus 0.50 wt. percent $Ga_2O_3$ plus 0.20 wt. percent $Cr_2O_3$* | 59 | 810 |
| 8 | $Pb(Zr_{0.52}Ti_{0.48})O_3$ plus 0.50 wt. percent $Ga_2O_3$ plus 0.50 wt. percent $Cr_2O_3$ | 51 | 710 |
| 9 | $Pb(Zr_{0.52}Ti_{0.48})O_3$ plus 0.50 wt. percent $Ga_2O_3$ plus 0.70 wt. percent $Cr_2O_3$ | 45 | 650 |

*$GaCl_3$ was contained in an amount equivalent to 0.20 wt. percent of $Ga_2O_3$.

Comparison of the results Nos. 1 and 2 of Table 1 shows that the addition of $Ga_2O_3$ of 0.50 weight percent (No. 2) to the basic composition (No. 1) raises the factor $Qm$ to a large extent. The results Nos. 3–9 show that the addition of chromium sesquioxide ($Cr_2O_3$) in amounts extending from 0.01 weight percent to 0.70 weight percent, with the content of gallium sesquioxide ($Ga_2O_3$) kept at 0.50 weight percent, remarkably raises the value of the factor $Kr$ while not deteriorating the value of $Qm$ for any arrangement including gallium sesquioxide ($Ga_2O_3$).

In the following examples, the results were achieved through treatments similar to those given in the prior example (unless otherwise mentioned).

Example 2.—Results shown in Table 2

Table 2 shows the results obtained for a mixture of the composition $Pb(Zr_{0.52}Ti_{0.48})O_3$ and 0.10 weight percent of the compound chromium sesquioxide ($Cr_2O_3$) alone, and for mixtures of this same compound $Cr_2O_3$ and compounds of from 0.01 weight percent to 1.5 weight percent of the compound gallium sesquioxide ($Ga_2O_3$).

TABLE 2

| No. | Composition | Kr (percent) | Qm |
|---|---|---|---|
| 10 | $Pb(Zr_{0.52}Ti_{0.48})O_3$ plus 0.10 wt. percent $Cr_2O_3$ | 51 | 770 |
| 11 | $Pb(Zr_{0.52}Ti_{0.48})O_3$ plus 0.01 wt. percent $Ga_2O_3$ plus 0.10 wt. percent $Cr_2O_3$ | 54 | 780 |
| 12 | $Pb(Zr_{0.52}Ti_{0.48})O_3$ plus 0.02 wt. percent $Ga_2O_3$ plus 0.10 wt. percent $Cr_2O_3$ | 59 | 820 |
| 13 | $Pb(Zr_{0.52}Ti_{0.48})O_3$ plus 0.05 wt. percent $Ga_2O_3$ plus 0.10 wt. percent $Cr_2O_3$ | 60 | 830 |
| 14 | $Pb(Zr_{0.52}Ti_{0.48})O_3$ plus 0.10 wt. percent $Ga_2O_3$ plus 0.10 wt. percent $Cr_2O_3$ | 60 | 830 |
| 15 | $Pb(Zr_{0.52}Ti_{0.48})O_3$ plus 0.20 wt. percent $Ga_2O_3$* plus 0.10 wt. percent $Cr_2O_3$ | 60 | 820 |
| 16 | $Pb(Zr_{0.52}Ti_{0.48})O_3$ plus 1.1 wt. percent $Ga_2O_3$ plus 0.10 wt. percent $Cr_2O_3$ | 57 | 730 |
| 17 | $Pb(Zr_{0.52}Ti_{0.48})O_3$ plus 1.5 wt. percent $Ga_2O_3$ plus 0.10 wt. percent $Cr_2O_3$ | 52 | 700 |

*$CrCl_3$ was contained in an amount equivalent to 0.20 wt. percent of $Cr_2O_3$.

Comparison of the result No. 1 of Table 1 with the result No. 10 of Table 2 shows that addition of 0.10 weight percent of $Cr_2O_3$ alone to the basic composition is sufficient to significantly augment both the Kr and Qm factors. The results Nos. 11 through 17 show that the addition of gallium sesquioxide ($Ga_2O_3$) of from 0.01 weight percent to 1.5 weight percent with the content of chromium sesquioxide ($Cr_2O_3$), kept in all these cases Nos. 11 to 17 at 0.10 weight percent, remarkably raises the value of the factor Kr while further augmenting or, at the worst, only slightly reducing, the value of the factor Qm when compared with the results of the addition of chromium sesquioxide ($Cr_2O_3$) (see Table 1). These results show that these compounds yield excellent piezoelectric materials for use in cases where a large Kr factor is specifically required.

Example 3.—Results shown in Table 3

Table 3 shows the Kr and Qm factors obtained from lead zirconate-lead titanate compositions wherein 0.45, 0.50, and 0.55 were selected for $x$ in the compositional formula $Pb(Zr_xTi_{1-x})O_3$ and from compositions obtained by having both the 0.50 weight percent of gallium sesquioxide ($Ga_2O_3$) and the 0.10 weight percent of chromium sesquioxide ($Cr_2O_3$) contained in each of the basic compositions.

TABLE 3

| No. | Composition | Kr (percent) | Qm |
|---|---|---|---|
| 18 | $Pb(Zr_{0.45}Ti_{0.55})O_3$ | 11 | 320 |
| 19 | $Pb(Zr_{0.45}Ti_{0.55})O_3$ plus 0.50 wt. percent $Ga_2O_3$ plus 0.10 wt. percent $Cr_2O_3$ | 33 | 940 |
| 20 | $Pb(Zr_{0.50}Ti_{0.50})O_3$ | 29 | 340 |
| 21 | $Pb(Zr_{0.50}Ti_{0.50})O_3$ plus 0.50 wt. percent $Ga_2O_3$ plus 0.10 wt. percent $Cr_2O_3$ | 43 | 810 |
| 22 | $Pb(Zr_{0.55}Ti_{0.45})O_3$ | 39 | 320 |
| 23 | $Pb(Zr_{0.55}Ti_{0.45})O_3$ plus 0.50 wt. percent $Ga_2O_3$ plus 0.10 wt. percent $Cr_2O_3$ | 58 | 770 |

These results clearly show that, regardless of change of the contents of Zr and Ti in the basic composition in the manner exemplified in this Table 3, the piezoelectric properties are remarkably improved by the addition thereto of both gallium sesquioxide ($Ga_2O_3$) of 0.50 weight percent and chromium sesquioxide ($Cr_2O_3$) of 0.10 weight percent. If compared with the result No. 6 of the example shown in Table 1, the results of Table 3 prove that excellent piezoelectric materials are obtained by the addition of both gallium sesquioxide ($Ga_2O_3$) and chromium sesquioxide ($Cr_2O_3$) to whichever of the basic compositions of these compositional formulae are employed.

Example 4.—Results shown in Table 4

Table 4 shows the Kr and Qm factors obtained when both a compound of 0.50 weight percent of gallium sesquioxide ($Ga_2O_3$) and a compound of 0.10 weight percent of chromium sesquioxide ($Cr_2O_3$) are contained in each of lead titanate-lead zirconates, wherein the Zr:Ti ratio is 52:48, and wherein barium (Ba) and strontium (Sr) are substituted for 5.0 atom percent of the lead forming a portion of the basic compositions, respectively.

TABLE 4

| No. | Composition | Kr (percent) | Qm |
|---|---|---|---|
| 24 | $(Pb_{0.95}Ba_{0.05})(Zr_{0.52}Ti_{0.48})O_3$ plus 0.50 wt. percent $Ga_2O_3$ plus 0.10 wt. percent $Cr_2O_3$ | 61 | 660 |
| 25 | $(Pb_{0.95}Sr_{0.05})(Zr_{0.52}Ti_{0.48})O_3$ plus 0.50 wt. percent $Ga_2O_3$ plus 0.10 wt. percent $Cr_2O_3$ | 58 | 670 |

Comparison of the results shown in this Table 4 with the result No. 6 of Table 1 shows that the abovementioned substitution does not diminish the improvement in the piezoelectric properties achieved by addition of both the 0.50 weight percent of gallium sesquioxide ($Ga_2O_3$) and the 0.10 weight percent of $Cr_2O_3$.

FIGS. 3 and 4, as already noted, show curves for the electromechanical coupling factor Kr and the mechanical quality factor Qm of the basic compositions in which a compound of NiO and MnO are additives as already explained.

Example 5.—Results shown in Table 5

So that the resulting basic composition may be represented by the formula $Pb(Zr_{0.52}Ti_{0.48})O_3$, the composition included powder consisting of 50 mol precent of lead monoxide (PBO), 26 mol percent of zirconium dioxide ($ZrO_2$), and 24 mol percent of titanium dioxide ($TiO_2$), and to this composition were added both a 0.20 weight percent of nickel oxide (NiO), and a compound of manganous oxide (MnO), in the stated amounts specified in Table 5, but in two of the cases (Nos. 7 and 9) a compound of manganese carbonate ($MnCO_3$) in the amounts noted in Table 5 was used as an additional constituent (the $MnCO_3$ being computed as if MnO were added). These chemicals were mixed in a ball mill. Mixed powder of the respective kinds was pre-sintered at 900° C. for an hour, crushed, press-moulded into discs, and sintered at 1300° C. for an hour. The resulting ceramic discs were provided with silver electrodes and piezoelectrically activated through polarization treatment at 100° C. for an hour under an electric field of 50 kv./cm. After the discs had been allowed to stand for 24 hours, the electromechanical coupling factor Kr for the radial mode vibration and the mechanical quality factor $Qm$ were measured to evaluate the relative piezoelectric activities. Typical results are shown in Table 5.

the coexistence of nickel oxide (NiO) scarcely improves the activities.

In view of the above, a range between 0.02 weight per-

TABLE 5

| No. | Composition | Kr (percent) | Qm |
|---|---|---|---|
| 1 | $Pb(Zr_{0.52}Ti_{0.48})O_3$ | 42 | 250 |
| 2 | $Pb(Zr_{0.52}Ti_{0.48})O_3$ plus 0.20 wt. percent NiO | 55 | 270 |
| 3 | $Pb(Zr_{0.52}Ti_{0.48})O_3$ plus 0.20 wt. percent NiO plus 0.02 wt. percent MnO | 59 | 270 |
| 4 | $Pb(Zr_{0.52}Ti_{0.48})O_3$ plus 0.20 wt. percent NiO plus 0.05 wt. percent NnO | 66 | 270 |
| 5 | $Pb(Zr_{0.52}Ti_{0.48})O_3$ plus 0.20 wt. percent NiO plus 0.10 wt. percet MnO | 66 | 330 |
| 6 | $Pb(Zr_{0.52}Ti_{0.48})O_3$ plus 0.20 wt. percent NiO plus 0.20 wt. percent MnO | 65 | 940 |
| 7 | $Pb(Zr_{0.52}Ti_{0.48})O_3$ plus 0.20 wt. percent NiO plus 0.30 wt. percent MnO* | 63 | 980 |
| 8 | $Pb(Zr_{0.52}Ti_{0.48})O_3$ plus 0.20 wt. percent NiO plus 0.50 wt. percent MnO | 60 | 840 |
| 9 | $Pb(Zr_{0.52}Ti_{0.48})O_3$ plus 0.20 wt. percent NiO plus 0.70 wt. percent MnO* | 58 | 630 |
| 10 | $Pb(Zr_{0.52}Ti_{0.48})O_3$ plus 0.20 wt. percent NiO plus 1.0 wt. percent MnO | 56 | 380 |

*$MnO_2$ is added as calculated on the basis of MnO.

Comparison of the results of samples Nos. 1 and 2 of Table 5 shows that the addition of the 0.20 weight percent of nickel oxide (NiO) alone to the basic composition provides piezoelectric material of raised $Kr$ and $Qm$ factors. However, the increase in the value of $Qm$ brought about by addition of nickel oxide (NiO) alone is not very great. A greater increase in the $Qm$ factor and a simultaneous increase in the $Kr$ factor would therefore provide more improved piezoelectric materials having a wider field of application.

FIG. 3 illustrates curves representing the results of this Example 5. More particularly, the curves show the rela-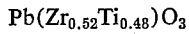

cent and 1.0 weight percent has been selected for the effective range of the manganous oxide (MnO) content.

Example 6.—Results shown in Table 6

Table 6 shows the results obtained for a mixture of the basic composition of $Pb(Zr_{0.52}Ti_{0.48})O_3$ that is the same as in Example 5 supra and an additional constituent of 0.20 weight percent of manganous oxide (MnO) alone (case No. 11) and for mixtures with further additions of nickel oxide (NiO) of from 0.02 weight percent to 2.0 weight percent as indicated in Table 6 for cases Nos. 12 to 17.

TABLE 6

| No. | Composition | Kr (percent) | Qm |
|---|---|---|---|
| 11 | $Pb(Zr_{0.52}Ti_{0.48})O_3$ plus 0.20 wt. percent Mno | 64 | 350 |
| 12 | $Pb(Zr_{0.52}Ti_{0.48})O_3$ plus 0.02 wt. percent NiO plus 0.20 wt. percent MnO | 64 | 400 |
| 13 | $Pb(Zr_{0.52}Ti_{0.48})O_3$ plus 0.05 wt. percent NiO plus 0.20 wt. percent MnO | 65 | 580 |
| 14 | $Pb(Zr_{0.52}Ti_{0.48})O_3$ plus 0.10 wt. percent NiO plus 0.20 wt. percent MnO | 65 | 820 |
| 15 | $Pb(Zr_{0.52}Ti_{0.48})O_3$ plus 0.50 wt. percent NiO* plus 0.20 wt. percent MnO | 67 | 720 |
| 16 | $Pb(Zr_{0.52}Ti_{0.48})O_3$ plus 1.0 wt. percent NiO plus 0.20 wt. percent MnO | 66 | 550 |
| 17 | $Pb(Zr_{0.52}Ti_{0.48})O_3$ plus 2.0 wt. percent NiO plus 0.20 wt. percent MnO | 65 | 380 |

*$NiCO_3.2Ni(OH)_2.4H_2O$ may be added as calculated on the basis of nickel oxide (NiO).

tions obtained between the $Kr$ and $Qm$ factors on the one hand and, on the other hand, the content of manganous oxide (MnO) in the case of the composition $$Pb(Zr_{0.52}Ti_{0.48})O_3$$

containing nickel oxide (NiO) of 0.20 weight percent and also manganous oxide (MnO) of 1.0 weight percent or less (in the amounts noted, for instance, in Table 5).

As will be clear from Table 5 and FIG. 3, it is possible to raise the $Kr$ factor and remarkably to augment the $Qm$ factor by addition of both nickel oxide (NiO) and manganous oxide (MnO) to the basic composition.

In general, an increase of one of the factors $Kr$ and $Qm$ reduces the other factor. On the contrary, however, the addition of both nickel oxide (NiO) and manganous oxide (MnO) to the basic composition makes it possible to simultaneously raise both factors $Kr$ and $Qm$ remarkably and to obtain piezoelectric materials having both factors $Kr$ and $Qm$ significantly increased. This serves to provide excellent material for use in the piezoelectric components of ceramic wave filters where specifically large $Kr$ factors are required and in transducers of mechanical filters.

In case the content of manganous oxide (MnO) is less than 0.02 weight percent, coexistence of the compounds nickel oxide (NiO) and manganous oxide (MnO) hardly improves the piezoelectric activities achieved by the presence of nickel oxide (NiO) alone. In case the content of manganous oxide (MnO) exceeds the 1.0 weight percent limit, the properties are so much and so rigidly altered regardless of presence of nickel oxide (NiO) that Comparison of the result of case No. 1 of Example 5 shown in Table 5 with the result of case No. 11 of Table 6 shows that addition of 0.20 weight percent of manganous oxide (MnO) alone to the basic composition provides a piezoelectric material having fairly augmented $Kr$ and $Qm$ factors. It should be understood, however, that further increases in factor $Kr$ and further increases in factor $Qm$, which are already augmented by addition of manganous oxide (MnO) alone, would provide piezoelectric materials having a wider field of application because they are improved piezoelectric materials.

Referring to FIG. 4, curves are shown to represent the results of this Example 6. More particularly, these curves show the relation between factors $Kr$ and $Qm$ on the one hand and, on the other hand, the content of nickel oxide (NiO) in cases in which both nickel oxide (NiO) of 2.0 weight percent or less and manganous oxide (MnO) of 0.20 weight percent (unchanged in amount) are added to the basic composition $Pb(Zr_{0.52}Ti_{0.48})O_3$, as is exemplified in Table 6.

As is clearly shown in Table 6 and FIG. 4, it is possible to provide piezoelectric materials having remarkably raised $Kr$ and $Qm$ factors by addition of both nickel oxide (NiO) and manganous oxide (MnO).

In case the content of nickel oxide (NiO) is less than 0.02 weight percent, coexistence of nickel oxide (NiO) and manganous oxide (MnO) contributes but little to the improvement of the piezoelectric properties attained by presence of manganous oxide (MnO) alone. In case the content of nickel oxide (NiO) exceeds 2.0 weight percent, the properties are so much and so rigidly altered regardless of presence of manganous oxide (MnO) that the coexistence of manganous oxide (MnO) hardly improves the properties.

In view of the above, a range between 0.02 weight percent and 2.0 weight percent is selected for the effective range of the nickel oxide (NiO) content.

It should be noted here that the improvements made in the piezoelectric properties by addition of both nickel oxide (NiO) and manganous oxide (MnO) clearly result from the preference of nickel and manganous ions. It is therefore possible, by introducing nickel ions into the solution, to use, besides nickel oxide (NiO), nickel carbonate [$NiCO_3 \cdot 2Ni(OH)_2 \cdot 4H_2O$] or any other nickel compound which is easily thermally decomposed into nickel oxide (NiO). Likewise, manganous ions may be put into the solution by using $MnCO_3$, manganese dioxide ($MnO_2$), or any other manganese compound which is easily converted at higher temperatures into MnO. In case nickel compounds other than nickel oxide are utilized, they should be used in an amount equivalent to the desired weight of nickel oxide (NiO). It is likewise true that manganese compounds other than manganous oxide (MnO); if utilized, should be used in an amount equivalent as calculated on the basis of the presence of manganous oxide (MnO). Use of such compounds is exemplified by the compositions Nos. 7 and 9 of Table 5 and No. 15 of Table 6. In this connection, it should be understood that nickel oxide (NiO) and manganous oxide (MnO) as used hereafter may also means such nickel and manganese compounds which may decompose at raised temperatures into nickel oxide (NiO) and manganous oxide (MnO) respectively.

composition serve to maintain the $Kr$ and $Qm$ factors relatively high in values.

Recapitulating, the compositions improved through addition of both nickel oxide (NiO) and manganous oxide (MnO) have excellent piezoelectric properties for use in manufacturing ceramic wave filters and transducers for mechanical filters.

Example 8.—Results shown in Table 8

Table 8 shows the piezoelectric properties of ceramics given by the formula $Pb(Zr_xTi_ySn_z)O_3$, where 0.47, 0.48, and 0.05 are selected for $x$, $y$, and $z$, respectively, in one example (No. 24) and where 0.42, 0.48, and 0.10 are selected for $x$, $y$, and $z$, respectively, in another example (No. 26) and of the ceramics obtained by adding, to each of these examples, 0.20 weight percent of nickel oxide (NiO) and 0.20 weight percent of manganous oxide (MnO) (Nos. 25 and 27, respectively).

Comparison of the results of Nos. 4 and 6 of Table 5 with the results of Table 8 makes it clear that substitution of Sn for a portion of $Pb(Zr-Ti)O_3$ does not degrade piezoelectric properties which were improved by addition of both nickel oxide (NiO) and manganous oxide (MnO). In other words, substantially equal improvements in piezoelectric properties are expected by the addition of both nickel oxide (NiO) and manganous oxide (MnO) from the composition $Pb(Zi-Ti-Sn)O_3$ as from the composition $Pb(Zn-Ti)O_3$.

TABLE 8

| No. | Composition | Kr (percent) | Qm |
|---|---|---|---|
| 24 | $Pb(Zr_{0.47}Ti_{0.48}Sn_{0.05})O_3$ | 40 | 280 |
| 25 | $Pb(Zr_{0.47}Ti_{0.48}Sn_{0.05})O$ plus 0.20 wt. percent NiO plus 0.20 wt. percent MnO | 63 | 910 |
| 26 | $Pb(Zr_{0.42}Ti_{0.48}Sn_{0.10})O_3$ | 41 | 300 |
| 27 | $Pb(Zr_{0.42}Ti_{0.48}Sn_{0.10})O_3$ plus 0.20 wt. percent NiO plus 0.20 wt. percent MnO | 62 | 930 |

Example 9.—Results shown in Table 9

In case at least one member of the group of calcium, strontium and barium is substituted for 5 atom percent of Pb in the composition No. 27 shown in Table 8, then the results shown in Table 9 are obtained.

TABLE 9

| No. | Composition | Kr (percent) | Qm |
|---|---|---|---|
| 29 | $(Pb_{0.95}Ca_{0.05})(Zr_{0.42}Ti_{0.48}Sn_{0.10})O_3$ plus 0.20 wt. percent NiO plus 0.20 wt. percent MnO | 59 | 910 |
| 30 | $(Pb_{0.95}Sr_{0.05})(Zr_{0.42}Ti_{0.48}Sn_{0.10})O_3$ plus 0.20 wt. percent NiO plus 0.20 wt. percent MnO | 63 | 920 |
| 31 | $(Pb_{0.95}Ba_{0.05})(Zr_{0.42}Ti_{0.48}Sn_{0.10})O_3$ plus 0.20 wt. percent NiO plus 0.20 wt. percent MnO | 61 | 940 |

Example 7.—Results shown in Table 7

Table 7 shows typical piezoelectric $Kr$ and $Qm$ properties of ceramics produced by selecting values of 0.00 for $z$, 0.50–0.55 for $x$, and 0.50–0.45 for $y$, in the composition $Pb(Zr_xTi_ySn_z)O_3$ and by adding thereto both a 0.20 weight percent of nickel oxide (NiO) and a 0.20 weight percent of manganous oxide (MnO).

Table 9 clearly demonstrates that piezoelectric properties are equally well improved by the coexistence of nickel oxide (NiO) and manganous oxide (MnO) for the cases where at least one member of the group of calcium, strontium and barium is substituted for a portion of the basic composition (as in Table 9) and the cases where no such substitution is effected in such basic

TABLE 7

| No. | Composition | Kr (percent) | Qm |
|---|---|---|---|
| 18 | $Pb(Zr_{0.50}Ti_{0.50})O_3$ | 29 | 340 |
| 19 | $Pb(Zr_{0.50}Ti_{0.50})O_3$ plus 0.20 wt. percent NiO plus 0.20 wt. percent MnO | 54 | 1,060 |
| 20 | $Pb(Zr_{0.53}Ti_{0.47})O_3$ | 41 | 300 |
| 21 | $Pb(Zr_{0.53}Ti_{0.47})O_3$ plus 0.20 wt. percent NiO plus 0.20 wt. percent MnO | 65 | 920 |
| 22 | $Pb(Zr_{0.55}Ti_{0.45})O_3$ | 39 | 320 |
| 23 | $Pb(Zr_{0.55}Ti_{0.45})O_3$ plus 0.20 wt. percent NiO plus 0.20 wt. percent MnO | 56 | 1,030 |

Table 7 clearly shows that the indicated changes in the above-noted values of $x$ and $y$ in the ceramic composition (which obviously does not include tin Sn) and are given by $Pb(Zr_xTi_y)O_3$, do not deteriorate the piezoelectric properties. The employment of nickel oxide (NiO) and manganous oxide (MnO) in the modified composition (as in No. 27, for example of Table 8.)

It should be noted again that the piezoelectric ceramic composition, improved as above indicated, can not be obtained by presence of either one of the compounds nickel oxide (NiO) or manganous oxide (MnO) alone; both compounds nickel oxide (NiO) and manganous oxide (MnO) should be present. It should further be noted that the piezoelectric properties referred to are obtained after polarization treatment carried out at temperatures (about 50° C.–150 C.) higher than room temperature. Inasmuch as it is inevitable that polarization-treatment practiced at room temperature reduces the value of the factor $Kr$, such low temperature polarization does not comply with the object of this invention.

FIGS. 5 and 6 show curves for the electromechanical coupling factor ($Kr$) and the mechanical quality factor $Qm$ for basic compositions in which nickel oxide (NiO) and chromium sesquioxide ($Cr_2O_3$) are the additives.

Example 10.—Results shown in Table 10

The basic composition used in this example may be reprensented by the term $Pb(Zr_{0.52}Ti_{0.48})O_3$, in which there are combined a powder consisting of 50 mol percent of lead monoxide (PbO), 26 mol percent of zirconium dioxide ($ZrO_2$), and 24 mol percent of titanium dioxide ($TiO_2$), with 0.50 weight percent of nickel oxide (NiO) provided as an additional constituent, and with a further addition of chromium sesquioxide ($Cr_2O_3$) of from 0.01 weight percent to 0.50 weight percent. These were mixed in a ball mill, pre-sintered at 900° C. for an hour, crushed press-moulded into discs, and sintered at 1300° C for an hour. The resulting ceramic discs were provided with silver electrodes and piezoelectrically activated at 100° C. for an hour under an electric field of 50 kv./cm. After the discs have been allowed to stand for 24 hours, the electromechanical coupling factor $Kr$ for the radial mode vibration and the mechanical quality factor $Qm$ were measured to evaluate the piezoelectric activities. Typical results obtained are shown in the following Table 10.

mium sesquioxide ($Cr_2O_3$) in the case in which the composition $Pb(Zr_{0.52}Ti_{0.48})O_3$ contains nickel oxide (NiO) of 0.50 weight percent and also chromium sesquioxide ($Cr_2O_3$) of 0.50 weight percent or less.

As will be clear from Table 10 and FIG. 5, it is possible to raise the factor $Qm$ substantially and to increase the factor $Kr$ by the addition of both nickel oxide (NiO) and chromium sesquioxide ($Cr_2O_3$) to the basic composition.

As already noted in other cases, an increase of one of the factors $Kr$ and $Qm$ reduces the other factor. But the addition of both compounds nickel oxide (NiO) and chromium sesquioxide ($Cr_2O_3$) to the basic composition simultaneously elevates factors $Kr$ and $Qm$. This provides excellent compositions for use as the piezoelectric materials for ceramic wave filters where large $Kr$ factors are required and in transducers for mechanical filters.

If the content of chromium sesquioxide ($Cr_2O_3$) is less than 0.01 weight percent, the coexistence of nickel oxide (NiO) and chromium sesquioxide ($Cr_2O_3$) serves little to improve the piezoelectric properties achieved by the presence of nickel oxide (NiO) alone. If the content of chromium sesquioxide ($Cr_2O_3$) exceeds 0.5 weight percent, the properties are so much altered regardless of presence of nickel oxide (NiO) that the coexistence of nickel oxide (NiO) scarcely improves the properties.

In view of the above, a range between 0.01 weight percent and 0.5 weight percent is selected for the effective range of the chromium sesquioxide ($Cr_2O_3$) content for the compositions considered.

Example 11.—Results shown by Table 11

Table 11 shows the results obtained for a mixture of

TABLE 10

| No. | Composition | $Kr$ (percent) | $Qm$ |
|---|---|---|---|
| 1 | $Pb(Zr_{0.52}Ti_{0.48})O_3$ | 42 | 250 |
| 2 | $Pb(Zr_{0.52}Ti_{0.48})O_3$ plus 0.50 wt. percent NiO | 56 | 260 |
| 3 | $Pb(Zr_{0.52}Ti_{0.48})O_3$ plus 0.50 wt. percent NiO plus 0.01 wt. percent $Cr_2O_3$ | 60 | 290 |
| 4 | $Pb(Zr_{0.52}Ti_{0.48})O_3$ plus 0.50 wt. percent NiO plus 0.02 wt. percent $Cr_2O_3$ | 64 | 380 |
| 5 | $Pb(Zr_{0.52}Ti_{0.48})O_3$ plus 0.50 wt. percent NiO plus 0.05 wt. percent $Cr_2O_3$ | 68 | 590 |
| 6 | $Pb(Zr_{0.52}Ti_{0.48})O_3$ plus 0.50 wt. percent NiO plus 0.10 wt. percent $Cr_2O_3$ | 66 | 900 |
| 7 | $Pb(Zr_{0.52}Ti_{0.48})O_3$ plus 0.50 wt. percent NiO plus 0.20 wt. percent $Cr_2O_3$* | 60 | 740 |
| 8 | $Pb(Zr_{0.52}Ti_{0.48})O_3$ plus 0.50 wt. percent NiO plus 0.30 wt. percent $Cr_2O_3$* | 58 | 620 |
| 9 | $Pb(Zr_{0.52}Ti_{0.48})O_3$ plus 0.50 wt. percent NiO plus 0.50 wt. percent $Cr_2O_3$ | 56 | 350 |

*$Cr_2(SO_4)_3$ may be added as calculated on the basis of chromium sesquioxide ($Cr_2O_3$).

Comparison of the results Nos. 1 and 2 of Table 10 shows that the addition of 0.50 weight percent of nickel oxide (NiO) alone to the basic composition provides piezoelectric material of raised $Kr$ and $Qm$ factors. However, the value of factor $Qm$ attained by addition of nickel oxide (NiO) alone is still insufficient for many purposes. A greater increase in the factor $Qm$ and a the basic composition of $Pb(Zr_{0.52}Ti_{0.48})O_3$ that is the same as that employed in Example 10, but in this case an additional constituent of 0.10 weight percent of chromium sesquioxide ($Cr_2O_3$) alone was used (No. 10) and there were other cases (Nos. 11 to 16) for mixtures with additions of nickel oxide (NiO) of from 0.02 weight percent to 2.0 weight percent.

TABLE 11

| No. | Composition | $Kr$ (percent) | $Qm$ |
|---|---|---|---|
| 10 | $Pb(Zr_{0.52}Ti_{0.48})O_3$ plus 0.10 wt. percent $Cr_2O_3$ | 53 | 780 |
| 11 | $Pb(Zr_{0.52}Ti_{0.48})O_3$ plus 0.02 wt. percent NiO plus 0.10 wt. percent $Cr_2O_3$ | 53 | 780 |
| 12 | $Pb(Zr_{0.52}Ti_{0.48})O_3$ plus 0.05 wt. percent NiO plus 0.10 wt. percent $Cr_2O_3$ | 59 | 800 |
| 13 | $Pb(Zr_{0.52}Ti_{0.48})O_3$ plus 0.10 wt. percent NiO plus 0.10 wt. percent $Cr_2O_3$ | 64 | 830 |
| 14 | $Pb(Zr_{0.52}Ti_{0.48})O_3$ plus 0.20 wt. percent NiO plus 0.10 wt. percent $Cr_2O_3$ | 65 | 880 |
| 15 | $Pb(Zr_{0.52}Ti_{0.48})O_3$ plus 1.0 wt. percent NiO* plus 0.10 wt. percent $Cr_2O_3$ | 61 | 830 |
| 16 | $Pb(Zr_{0.52}Ti_{0.48})O_3$ plus 2.0 wt. percent NiO plus 0.10 wt. percent $Cr_2O_3$ | 55 | 790 |

*$NiCo_3 \cdot 2Ni(OH)_2 \cdot 4H_2O$ was added as calculated on the basis of NiO.

concurrent increase in the factor $Kr$ would provide more improved piezoelectric materials having wider fields of application.

FIG. 5 illustrates curves representing the results of Example 10. More particularly, the curves show the relations obtained between factors $Kr$ and $Qm$ on the one hand and, on the other hand, the content of chro- Comparison of the result No. 1 of Example 10 with the result No. 10 in Table 11 shows that addition of 0.10 weight percent of chromium sesquioxide ($Cr_2O_3$) alone to the basic composition provides a piezoelectric material having fairly elevated $Kr$ and $Qm$ factors. It should be understood, however, that further increases in the factor $Kr$ and increases in factor $Qm$, which have already been increased by the addition of chromium sesquioxide $(Cr_2O_3)$ alone, would provide piezoelectric materials having wider fields of application and hence these would constitute improved piezoelectric materials.

In FIG. 6, curves are shown representing the results of this Example 11. More particularly, these curves show the relation between factors $Kr$ and $Qm$ with respect to nickel oxide (NiO) when both nickel oxide (NiO) of 2.0 weight percent or less and chromium sesquioxide $(Cr_2O_3)$ of 0.10 weight percent are added to the composition $Pb(Zr_{0.52}Ti_{0.48})O_3$.

As is clearly shown in Table 11 and FIG. 6, it is possible to provide excellent piezoelectric materials having substantially elevated $Kr$ and $Qm$ factors by the addition of both nickel oxide (NiO) and chromium sesquioxide $(Cr_2O_3)$.

composed at elevated temperatures into equivalent nickel oxide (NiO) and chromium sesquioxide $(Cr_2O_3)$ compounds, respectively.

Example 12.—Results shown in Table 12

Table 12 shows typical piezoelectric properties of the ceramics produced by selecting and assigning 0.00 for $z$, 0.50–0.55 for $x$ and 0.50–0.45 for $y$ in the formula $Pb(Zr_xTi_ySn_z)O_3$ and of the ceramics produced by adding thereto 0.50 weight percent of nickel oxide (NiO) and 0.10 weight percent of chromium sesquioxide $(Cr_2O_3)$. As will be apparent from Table 12, the latter additives are unchanged in their relative magnitudes in the composition, but the $x$ and $y$ components are varied within the indicated limits.

TABLE 12

| No. | Composition | $Kr$ (percent) | $Qm$ |
|---|---|---|---|
| 17 | $Pb(Zr_{0.50}Ti_{0.50})O_3$ | 29 | 340 |
| 18 | $Pb(Zr_{0.50}Ti_{0.50})O_3$ plus 0.50 wt. percent NiO plus 0.10 wt. percent $Cr_2O_3$ | 55 | 1,020 |
| 19 | $Pb(Zr_{0.53}Ti_{0.47})O_3$ | 41 | 300 |
| 20 | $Pb(Zr_{0.53}Ti_{0.47})O_3$ plus 0.50 wt. percent NiO plus 0.10 wt. percent $Cr_2O_3$ | 65 | 880 |
| 21 | $Pb(Zr_{0.55}Ti_{0.45})O_3$ | 39 | 320 |
| 22 | $Pb(Zr_{0.55}Ti_{0.45})O_3$ plus 0.50 wt. percent NiO plus 0.10 wt. percent $Cr_2O_3$ | 56 | 980 |

As in other cases, if the content of nickel oxide (NiO) is less than 0.02 weight percent, the coexistence of nickel oxide (NiO) and chromium sesquioxide $(Cr_2O_3)$ contributes little to the improvement of the piezoelectric properties attained by the addition of chromium sesquioxide $(Cr_2O_3)$ alone. If the content of nickel oxide (NiO) exceeds 2.0 weight percent, the properties are considerably altered regardless of presence of chromium sesquioxide $(Cr_2O_3)$. Hence, hte coexistence of chromium sesquioxide $(Cr_2O_3)$ hardly improves the properties.

In view of the above, a range between 0.02 weight percent and 2.0 weight percent is selected for the effective range of the nickel oxide (NiO) content.

The improvements effected in the piezoelectric properties by addition of both nickel oxide (NiO) and chromium sesquioxide $(Cr_2O_3)$ clearly result from presence of nickel and chromium ions. As in other cases, the ion content is the significant item. It is therefore possible, by introducing nickel ions into the mixture, to use, in substitution for nickel oxide (NiO), the compound nickel carbonate $[NiCO_3 \cdot 2Ni(OH)_2 \cdot 4H_2O]$ or any other nickel compound which is easily thermally decomposed into nickel oxide (NiO). Likewise, chromium ions may be put into the composition by using, instead of chromium sesquioxide $(Cr_2O_3)$, the compound chromium sulphate $[Cr_2(SO_4)_3]$ or any other chromium compound which is easily thermally decomposed into chromium sesquioxide $(Cr_2O_3)$. In case nickel and/or chromium compounds other than nickel oxide (NiO) and chromium sesquioxide $(Cr_2O_3)$ are utilized, they should be used in amounts equivalent to their respective desired weights of nickel oxide (NiO) and chromium sesquioxide $(Cr_2O_3)$. Use of such compounds is exemplified by the compositions Nos. 7 and 8 in Table 10 and No. 15 in Table II. In this connection, it should be understood that nickel oxide (NiO) and chromium sesquioxide $(Cr_2O_3)$, as used in accordance with this invention, may also mean or include such nickel and chromium compounds which may be de- Table 12 clearly shows that change of the values of the $x$ and $y$ components in the ceramic composition, whose basic composition is $Pb(Zr_xTi_ySn_z)O_3$ where Sn is zero, does not adversely affect the piezoelectric properties otherwise improved by coexistence of nickel oxide (NiO) and chromium sesquioxide $(Cr_2O_3)$ in the composition.

Recapitulating, the compositions, improved through addition of both nickel oxide (NiO) and chromium sesquioxide $(Cr_2O_3)$, have excellent piezoelectric properties for use in manufacturing the ceramic piezoelectric wave filters and the transducer components of mechanical filters.

Example 13.—Results shown in Table 13.

Table 13 shows the piezoelectric properties of ceramics defined by the formula $Pb(Zr_xTi_ySn_z)O_3$, where 0.47, 0.48, and 0.05 are selected for $x$, $y$, and $z$, respectively, of certain compositions (No. 23 of Table 13), and where 0.42, 0.48, and 0.10 are selected for $x$, $y$, and $z$, respectively, of certain other compositions (No. 25 of Table 13), and of the ceramics obtained by adding thereto 0.50 weight percent of nickel oxide (NiO) and 0.10 weight percent of chromium sesquioxide $(Cr_2O_3)$ (Nos. 24 and 26 of Table 13).

TABLE 13

| No. | Composition | $Kr$ (percent) | $Qm$ |
|---|---|---|---|
| 23 | $Pb(Zr_{0.47}Ti_{0.48}Sn_{0.05})O_3$ | 40 | 280 |
| 24 | $Pb(Zr_{0.47}Ti_{0.48}Sn_{0.05})O_3$ plus 0.50 wt. percent NiO plus 0.10 wt. percent $Cr_2O_3$ | 65 | 880 |
| 25 | $Pb(Zr_{0.42}Ti_{0.48}Sn_{0.10})O_3$ | 41 | 300 |
| 26 | $Pb(Zr_{0.42}Ti_{0.48}Sn_{0.10})O_3$ plus 0.50 wt. percent NiO plus 0.10 wt. percent $Cr_2O_3$ | 63 | 870 |

Comparison of the result No. 6 in Table 10 with the results in Table 13 makes it clear that substitution of tin (Sn) for a portion of Pb(Zr-Ti)$O_3$ does not substantially reduce the piezoelectric properties otherwise improved by addition of both nickel oxide (NiO) and chromium sesequioxide $(Cr_2O_3)$. In other words, equal improvements in the piezoelectric properties are expected and obtained by addition of both nickel oxide (NiO) and chromium sesquioxide $(Cr_2O_3)$ from the generalized composition Pb(Zr-Ti-Sn)$O_3$ as from the generalized composition Pb(Zr-Ti)$O_3$.

Example 14.—Results shown in Table 14.

If at least one member of the group consisting of calcium (Ca), strontium (Sr), and barium (Ba) is substituted for 5 atom percent of lead (Pb) in the composition No. 26 shown in Table 13, then the results shown in Table 14 are obtained.

TABLE 14

| No. | Composition | Kr (percent) | Qm |
|---|---|---|---|
| 28 | $(Pb_{0.95}Ca_{0.05})(Zr_{0.42}Ti_{0.48}Sn_{0.10})O_3$ plus 0.50 wt. percent NiO plus 0.10 wt. percent $Cr_2O_3$ | 59 | 860 |
| 29 | $(Pb_{0.95}Sr_{0.05})(Zr_{0.42}Ti_{0.48}Sn_{0.10})O_3$ plus 0.50 wt. percent NiO plus 0.10 wt. percent $Cr_2O_3$ | 64 | 880 |
| 30 | $(Pb_{0.95}Ba_{0.05})(Zr_{0.42}Ti_{0.48}Sn_{0.10})O_3$ plus 0.50 wt. percent NiO plus 0.10 wt. percent $Cr_2O_3$ | 62 | 900 |

Table 14 clearly shows that the piezoelectric properties are equally well improved by the coexistence of nickel oxide (NiO) and chromium sesquioxide ($Cr_2O_3$) in the basic composition No. 26 of Table 13, where at least one member of the group of calcium (Ca), strontium (Sr), and barium (Ba) is substituted for a portion of the basic composition No. 26 and where no such substitution is effected.

It should be noted again that the piezoelectric ceramic composition improved as above can not be obtained by the addition of either nickel oxide (NiO) or chromium sesquioxide ($Cr_2O_3$) alone but only by the joint addition or coexistence of nickel oxide (NiO) and chromium sesquioxide ($Cr_2O_3$). It is repeated that the improvement in the piezoelectric properties is obtained through polarization treatment carried out at temperatures (about 50° C.–150° C.) higher than room temperature.

A considerable number of examples have been offered to establish the novelty and merit of a modified formula based on the formula expressed generally as $$(Pb_uA_v)(Zr_xTi_ySn_z)O_3$$

where A represents one or more of the elements calcium, strontium and barium and where $u=0.75$–$1.00$, $v=0.00$–$0.25$, $u+v=1.00$, $x=0.00$–$0.90$, $y=0.10$–$0.60$, $z=0.00$–$0.65$, and $x+y+z=1.00$.

The formulation, when modified as noted in the specification, produces outstanding piezoelectric ceramic materials. The modifications should include, according to this invention, any pair of the following three pairs of compounds:

Pair 1

| | Wt. percent |
|---|---|
| $Ga_2O_3$ | 0.01–1.5 |
| $Cr_2O_3$ | 0.01–0.7 |

Pair 2

| | |
|---|---|
| MnO | 0.02–0.1 |
| NiO | 0.02–2.0 |

Pair 3

| | |
|---|---|
| NiO | 0.02–2.0 |
| $Cr_2O_3$ | 0.01–0.5 |

While this invention has been set forth in certain particular compositions merely for illustration, it will be understood that the general principles of this invention may be applied to other and widely varied compositions without departing from the spirit of the invention and the scope of the appended claims.

What is claimed is:
1. A piezoelectric ceramic composition having a basic composition represented by the following compositional formula

$$(Pb_uA_v)(Zr_xTi_ySn_z)O_3$$

where A represents at least one member selected from a group consisting of calcium, strontium, and barium and $u$, $v$, $x$, $y$, and $z$ are given by $u=0.75$–$1.00$, $v=0.00$–$0.25$, $u+v=1.00$, $x=0.00$–$0.90$, $y=0.10$–$0.60$, $z=0.00$–$0.65$, and $x+y+z=1.00$, characterized in that said ceramic composition contains a set of additional constituents consisting of a gallium compound equivalent in amount to gallium sesquioxide of from 0.01 to 1.5 weight percent and a chromium compound equivalent in amount to chromium sesquioxide of from 0.01 to 0.70 weight percent, each of said weight percentages being the percentage of the total weight of said ceramic composition.

2. A piezoelectric ceramic composition according to claim 1, wherein the set of said additional constituents consists of a gallium sesquioxide of from 0.01 to 1.5 weight percent and a chromium sesquioxide of from 0.01 to 0.70 weight percent, each of the weight percentages being the percentage of the total weight of said ceramic composition.

3. A piezoelectric ceramic composition according to claim 2, wherein the additional constituents consist of gallium sesquioxide of from 0.01 to 1.5 weight percent and chromium sesquioxide of from 0.01 to 0.3 weight percent.

4. A piezoelectric composition according to claim 1 in which said composition has been subjected to a polarization treatment at temperatures of 50 to 150 degrees centigrade.

5. A piezoelectric ceramic composition having the following formula $$Pb(Zr_xTi_ySn_z)O_3$$

where $x$, $y$ and $z$ are given by $x=0.00$–$0.90$, $y=0.10$–$0.60$, $z=0.00$–$0.65$, and $x+y+z=1.00$, characterized in that said ceramic composition contains a set of additional constituents consisting of gallium sesquioxide of from 0.01 to 1.5 weight percent and chromium sesquioxide of from 0.01 to 0.70 weight percent.

6. A piezoelectric ceramic composition having the following formula $$Pb(Zr_xTi_y)O_3$$

where $x=0.00$–$0.90$, $y=0.10$–$0.60$, and $x+y=1.00$, characterized in that said ceramic composition contains a set of additional constituents consisting of gallium sesquioxide of from 0.01 to 1.5 weight percent and chromium sesquioxide of from 0.01 to 0.70 weight percent.

References Cited

UNITED STATES PATENTS 3,068,177  12/1962  Sugden _____ 252—62.9
3,347,795  10/1967  Akashi et al. _____ 252—62.9

FOREIGN PATENTS 1,070,224  6/1967  Great Britain.

TOBIAS E. LEVOW, Primary Examiner

J. COOPER, Assistant Examiner

U.S. Cl. X.R.

106—39